(12) United States Patent
Koehler

(10) Patent No.: US 7,599,540 B2
(45) Date of Patent: Oct. 6, 2009

(54) MOTION COMPENSATED RECONSTRUCTION TECHNIQUE

(75) Inventor: Thomas Koehler, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 787 days.

(21) Appl. No.: 10/560,187

(22) PCT Filed: Jun. 18, 2004

(86) PCT No.: PCT/IB2004/050894

§ 371 (c)(1),
(2), (4) Date: Dec. 9, 2005

(87) PCT Pub. No.: WO2004/111946

PCT Pub. Date: Dec. 23, 2004

(65) Prior Publication Data

US 2006/0140482 A1  Jun. 29, 2006

(30) Foreign Application Priority Data

Jun. 18, 2003  (EP)  .................................. 03101784

(51) Int. Cl.
G06K 9/00 (2006.01)
A61B 6/00 (2006.01)
G01N 23/00 (2006.01)
G21K 1/12 (2006.01)
H05G 1/60 (2006.01)

(52) U.S. Cl. ....................... 382/130; 382/128; 382/131; 378/4; 378/21

(58) Field of Classification Search ................. 382/128, 382/130, 131; 378/4, 20, 21
See application file for complete search history.

(56) References Cited

U.S. PATENT DOCUMENTS

| | | | |
|---|---|---|---|
| 4,937,526 A | 6/1990 | Ehman et al. | 324/309 |
| 5,224,037 A | 6/1993 | Jones et al. | 364/413.19 |
| 5,287,276 A | 2/1994 | Crawford et al. | 364/413.19 |
| 5,555,324 A * | 9/1996 | Waxman et al. | 382/254 |
| 5,703,369 A | 12/1997 | Mori | 250/363.03 |
| 5,889,525 A | 3/1999 | DeMurcia et al. | 345/420 |
| 6,310,968 B1 | 10/2001 | Hawkins et al. | 382/131 |
| 6,329,819 B1 | 12/2001 | Manduca et al. | 324/309 |
| 2004/0081269 A1* | 4/2004 | Pan et al. | 378/4 |

FOREIGN PATENT DOCUMENTS

FR  2 602 602  2/1988

OTHER PUBLICATIONS

Klein, G.J.; Four-Dimensional Processing of Deformable Cardiac PET Data; 2000; IEEE Proceedings; pp. 127-134.
Klein, G.J., et al.; Real-Time System for Respiratory-Cardiac Gating in Positron Tomography; 1998; Proc. Of IEEE; pp. 1284-1287.
Klein, G.J., et al.; Four-Dimensional Affine Registration Models for Respiratory-Gated PET; 2001; IEEE Trans. On Nuclear Science; 48(3):756-760.
Schaffter, T., et al.; Correlative Averaging for Radial Magnetic Resonance Imaging; 1998; Philips J. of Research; 51(2):269-281.
Schaffter, T., et al.; Motion Compensated Projection Reconstruction; 1999; MRM; 41:954-963.

* cited by examiner

*Primary Examiner*—John B Strege

(57) ABSTRACT

The long scan time in PET imaging may lead to a significant loss of resolution, due to patient or organ motion. According to the present invention, the distortion or motion may be compensated by performing a forward-projection, and/or back-projection of the intermediate image on the basis of a motion field describing a motion and/or distortion of the object of interest.

9 Claims, 4 Drawing Sheets

MOTION COMPENSATED RECONSTRUCTION TECHNIQUE

The present invention relates to the field of digital imaging. In particular, the present invention relates to a motion compensated image reconstruction from projections as in positron emission tomography (PET), single photon emission computed tomography (SPECT) and computed tomography (CT). More specifically, the present invention relates to a method of reconstructing an image from emission or transmission data of an object, to an image processing device for reconstructing an image from emission or transmission data, to a PET, SPECT, or CT system and to a computer program product.

In medical imaging techniques known as emission computer tomography, images of an object are created based on the detection of gamma rays emitted from the object. The gamma rays may be emitted from a tracer accumulated in the object. Such a tracer may, for example, be based on $^{18}$F-fluorordeoxyglucose. In positron emission tomography (PET), positron-electro annihilations within the object to be imaged cause gamma rays to be emitted in pairs of two gamma photons, which fly in (almost) exactly opposite directions. The path formed by each pair of gamma photons represents a line, which is sometimes referred to as a "line of response". The specific distribution of the positron emitting contrast agent or tracer within the object can be determined by calculating the positions of these lines of coincidence. The aggregate of such information can be used to reconstruct an image.

Energy carried by the gamma photons is typically sensed by detectors disposed in an array around the object under study. The detectors convert the energy carried by the gamma photons, to record the position of the event which gave rise to the rays. Electrical signals representative of the detected gamma photons may be processed by a system, which typically includes a programmed digital computer capable of processing the position data to form an image of the structure, organ or patient under examination. It is the aim of PET-imaging to reconstruct the distribution of the contrast agent or tracer within the human body or object. This distribution is called emission image and is reconstructed from the emission measurement or emission data acquired as described above.

The period of time necessary for such measurements depends upon the half-time of the tracer or agent used as well as on the maximum count rate that the system can handle and is occasionally ten minutes to 45 minutes. Conventionally, the object needed to be fixed both in position and direction during the measurement period. Such stationary posture may be very painful to a human body or an animal. Also, the significantly long scan time leads to significant losses of resolution due to patient or organ motion, in particular for heart and thorax imaging where heart and breathing motion is present during the data acquisition. Also, artifacts due to a motion or deformation of the object of interest appear in the image obtained by image reconstruction. In known techniques, only data which belong to a certain phase of the motion are used for reconstruction. This results in less artifacts and sharper images, but the signal-to-noise-ratio is significantly reduced because some data are no longer used for reconstruction.

It is an object of the present invention to provide for an improved image reconstruction.

According to an aspect of the present invention, the above object may be solved by a method according to claim 1 for reconstructing an image from measured time integrals of an object. According to this exemplary embodiment of the present invention, the measured line-integrals are binned into a plurality of temporal bins, a plurality of motion fields is determined for the plurality of temporal bins and first data are selected from a selected bin of the plurality of temporal bins. Then, an intermediate image is forward-projected for forming second data by using a motion field of the plurality of motion fields that belongs to the selected temporal bin. Then, a difference between the first data and the second data is determined and the intermediate image is up-dated on the basis of the difference.

Advantageously, the above method takes a motion and deformation of the object of interest into account. Furthermore, it may still allow to maximize a likelihood function. Overall, according to this exemplary embodiment of the present invention, even in the presence of motion or deformation in the object of interest, a proper reconstruction may be realized, yielding a sharp image with high signal-to-noise-ratio.

Claims 2 to 6 provide for further advantageous embodiments of the present invention.

Another exemplary embodiment of the present invention as set forth in claim 7 provides for an image processing device for reconstructing an image from measured line integrals, which, e.g. during the reconstruction of a PET image, takes into account a motion and/or deformation of the object of interest.

Another exemplary embodiment of the present invention as set forth in claim 8 provides for a positron emission tomography system, which may include a scanner system, such as the one, for example, depicted in U.S. Pat. No. 5,703,369, which is hereby incorporated by reference, which allows for sharp PET images, even in the case of a moving, and/or deforming object of interest.

According to another exemplary embodiment of the present invention as set forth in claim 9, a computer program product comprising a computer program is provided, causing a processor to perform an operation when the computer program is executed on the processor, corresponding to the method according to the present invention. The computer program may be written in any suitable programming language, for example, in C++. The computer program product may be stored on a computer readable medium such as a CD-ROM. Also, these computer programs may be available from a network, such as the WorldWideWeb, from which they may be downloaded into image processing units or processors, or any suitable computers.

It may be seen as the gist of an exemplary embodiment of the present invention that a motion compensated iterative reconstruction technique for reconstructing an image from measured line integrals is provided, taking a motion and/or deformation of the object of interest into account. In particular, according to an aspect of the present invention, the forward projection of the iterative reconstruction technique is performed on the basis of a motion field describing at least one of a motion or deformation of the object with respect to a reference grid of the intermediate image.

These and other aspects of the present invention will become apparent from and will be elucidated with reference to the embodiments described hereinafter.

Exemplary embodiments of the present invention will be described in the following, with reference to the following drawings.

Figure 1:
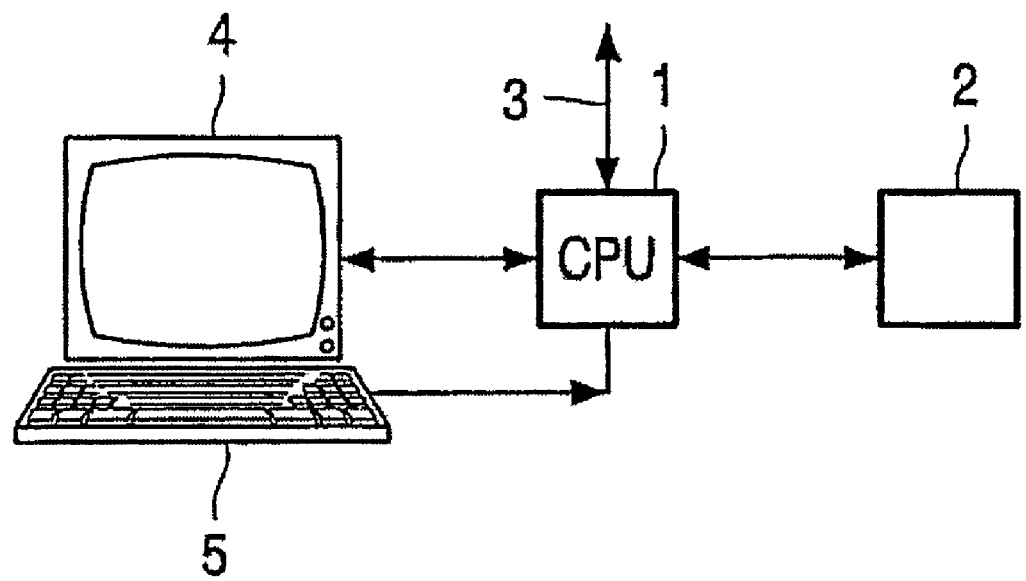
FIG. 1 shows a schematic representation of an image processing device according to an exemplary embodiment of the present invention, adapted to execute an exemplary embodiment of a method according to the present invention.

FIG. 1 shows an exemplary embodiment of an image processing device according to the present invention. The image processing device shown in FIG. 1 includes an image processing and control processor 1, with a memory 2, in which the measured line integrals, for example, the detected sinogram and an intermediate image generated and/or updated during the operation may be stored. The image processing and control processor (CPU) 1 may be coupled, via a bus system 3, to an imaging device (not shown in FIG. 1), for example, a PET scanner, such as the one described in U.S. Pat. No. 5,703,369, which is hereby incorporated by reference. An image generated by the image processing and control processor 1 may be displayed to an operator on a monitor 4, connected to the image processing and control processor 1. The operator may access the image processing and control processor 1 via a keyboard 5 or other input means, which are not shown in FIG. 1, such as a mouse or a trackball.

Furthermore, via the bus system 3, it is also possible to connect the image processing and control processor 1 to, for example, a motion monitor, which monitors a motion of the object of interest. In case, for example, a lung of a patient is imaged, the motion sensor may be an exhalation sensor. In case the heart is imaged, the motion sensor may be an electrocardiogram (ECG).

Figure 2:
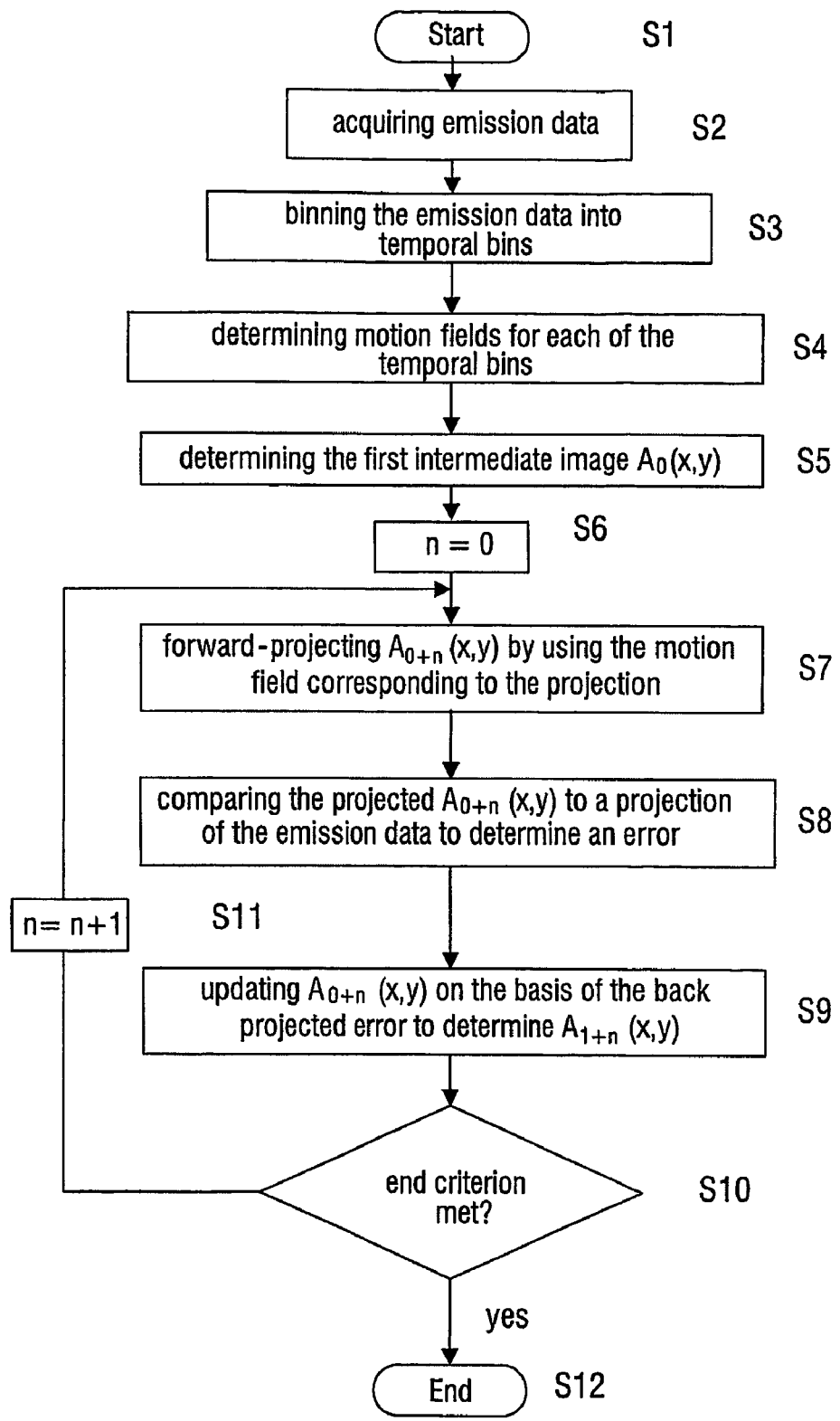
FIG. 2 shows a flowchart of an exemplary embodiment of an operation of the image processing device of FIG. 1 in accordance with the present invention.

FIG. 2 shows a flowchart of a method for operating the image processing device depicted in FIG. 1 in accordance with an exemplary embodiment of the present invention.

After the start in step S1, the emission data is acquired in step S2. This may, for example, be done using a suitable PET scanner or by reading the emission data from a storage. The emission data consists of a plurality of line-integrals of the unknown tracer concentration relating to the position and/or orientation of the line of response (LOR) on which the event was happening and the integral of the events over the measurement time. Typically events with the same or almost the same LOR are added to from a so-called line integral. Furthermore, line integrals, which belong to parallel LORs, are grouped together. Such a group is called projection. The data structure containing projections from 0 to 180 degrees is usually referred to as sinogram. Here, in the subsequent step S3, according to an aspect of the present invention, events of the emission data are binned additionally into temporal bins. However, according to an aspect of the present invention, the present invention may also be applied to spatially non-binned single events by using so-called list-mode reconstruction.

Each temporal bin belongs to a certain motion state. In other words, in case an organ with a more or less periodical motion is imaged, the emission data is rearranged such that projections acquired at a similar phase or motion state are binned into the same temporal bin. The decision as to which temporal bin an event belongs may be made on the basis of information acquired by means of a motion sensor, such as, for example, an exhalation sensor or an electrocardiogram. According to an aspect of the present invention, it may also be possible to use intrinsic information in the emission data itself, such as the center of gravity of the events averaged at a few ten or hundred milliseconds as described in further detail in "Four-dimensional affine registration models for respiratory-gated PET", Klein, G. J.; Reutter, R. W.; Huesman, Nuclear Science, IEEE Transactions on, Volume: 48 Issue: 3, June 2001 Page(s): 756-760, which is hereby incorporated by reference.

A three dimensional image is reconstructed from each temporal bin using standard reconstruction techniques. These images may be reconstructed in a low resolution in order to obtain a reasonable signal-to-noise-ratio and to keep the computational cost modest. A motion field describing the motion of the image relative to a chosen reference image (which can be for instance the image with the highest signal-to-noise-ratio) is determined for each image in step S4. A motion field describes a motion and/or deformation of the object of interest at a certain point of time. The motion field may be determined in accordance with the method described in T. Schäffter, V. Rasche, I. C. Carlsen, "Motion Compensated Projection Reconstruction", Magnetic Resonance in Medicine 41: 954-963 (1999), which is hereby incorporated by reference.

Figure 3:
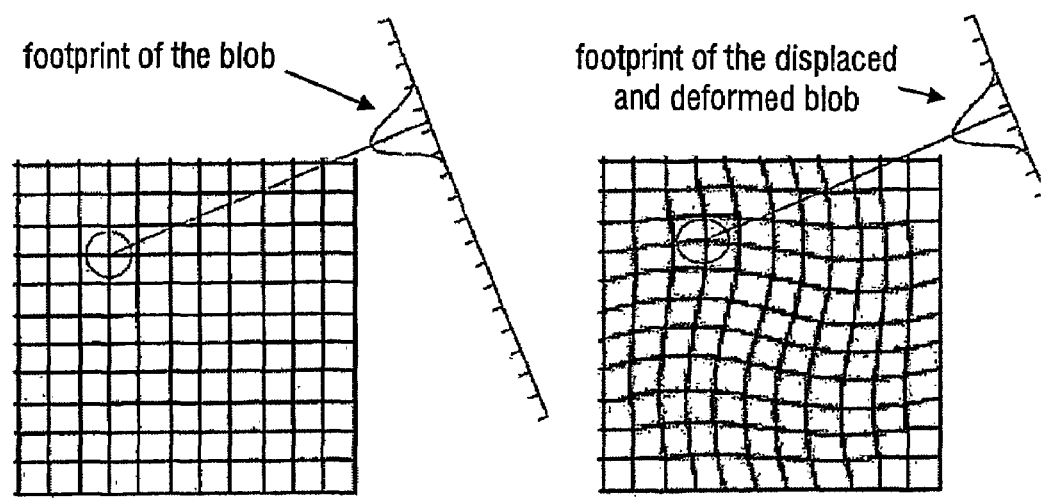
FIG. 3 shows a simplified schematic representation for further explaining the present invention.

FIG. 3 shows examples of such motion fields. The left side of FIG. 3 shows an undisturbed reference motion field and the motion field on the right side of FIG. 3 shows another motion state where the grid of the motion field is deformed. In comparison to the left side of FIG. 3, the grid points $r_i$ in the grid on the right side of FIG. 3 are displaced by a vector $\Delta_i$ due to the motion.

In other words, the grid points $r_i$ of the grid of the motion fields describe the local motion or deformation of the object of interest.

Then, the method continues to step S5, where a first intermediate image $A_0(x,y)$ is determined. The first intermediate image $A_0(x,y)$ may, for example, be a homogenous distribution, a filtered-back projection of the emission data or a simple back-projection of the emission data. Then, in the next step S6, a counter is initiated with n=0. In the subsequent steps S7 to S12, the motion compensated iterative image reconstruction is performed.

In step S7, the intermediate image $A_{0+n}(x,y)$, in the case of the first iteration, the first intermediate image determined in step S5, is forward-projected by using the motion fields corresponding to the projection. In other words, the intermediate image $A_{0+n}(x,y)$ is forward-projected by using motion or deformation information gathered from the motion field corresponding to the motion of the object of interest at such point in time.

Then, in the subsequent step S8, the forward projected $A_{0+n}(x,y)$ is compared to a corresponding projection of the emission data to determine a difference between the projected intermediate image $A_{0+n}(x,y)$ and the projection actually measured. In other words, in step S8, a comparison is made between the motion and/or deformation compensated intermediate image and the projection actually measured at the time. In a simple case, the difference may simply be determined on the basis of a subtraction.

Then, the method continues to step S9, where the difference or error determined in step S8 is back-projected by using the motion field used in step S7. This may simply be done by storing the integration weights of the individual voxels of the intermediate image $A_{0+n}(x,y)$ during the forward-projection in step S7. These integration weights define how strongly the voxel contributed to the line integrals. The same weights can be applied after proper normalization during the back-projection in step S9. This results in a new (updated) intermediate image $A_{1+n}(x,y)$ in step S9. Then, the method continues to step S10, where it is determined whether an end criterion is met or not. The end criterion may, for example, be that the iteration was performed for all projections of the emission data or that the differences between the projection actually measured and the intermediate image $A_{0+n}(x,y)$ are below a predetermined threshold. In case it is determined in step S10 that the end criterion is not met, the method continues to step S11, where the counter n is incremented: n=n+1. Then, the method continues to step S7, where the new intermediate image determined in step S9 is forward-projected. Then, steps S7 to S11 are iteratively repeated until the end criterion is met. In case it is determined in step S10 that the end criterion is met, the method continues to step S12, where it ends.

In other words, as described above, during iterative reconstruction, the intermediate image $A_{0+n}(x,y)$ is updated based on the information of a selected projection (or a selected line of response LOR). Each projection belongs to a certain motion state and the position of the grid points $r_i$ are displaced by a vector $\Delta_i$ due to the motion. Then, as indicated with reference to step S7, in the forward-projection, the contribution of the activity located at each grid point to the signal in the selected projection is calculated. According to the present invention, in this step, the true position $r_i+\Delta_i$ of the grid point in the current motion state is used, thus allowing for a compensation of the motion. Furthermore, according to an aspect of the present invention, the local deformation of the gird is taken into account. The local topology is critical, since the image value at a grid point represents the activity in the neighborhood of the grid point. The distribution of the activity over the neighborhood is usually referred to as basis function. Basis functions are, for example, voxels or blobs. According to the present invention as described above, the shape of the basis function is also subjected to the local deformation derived from the motion field. As described with reference to FIG. 2, this is made by using the respective motion field, corresponding to the projection in the forward-projection in step S7 and the back-projection in step S9. In a first approximation, a rotation, a sheering and/or a stretching or compression may describe such local deformation. After deformation, the blob may be renormalized, in order to ensure that the normal activity represented by the image is invariant.

As mentioned above, FIG. 3 shows two motion fields: on the left side, a first motion field, including a rectangular, not deformed grid belonging to the reference temporal bin; on the right side of FIG. 3 there is depicted a second deformed grid, where the grid points are displaced by vectors $\Delta_i$. The motion field on the left side of FIG. 3 is the motion field of reference image $A_{0+n}(x,y)$. The motion field on the right side of FIG. 3 describes the motion and/or deformation of the object of interest at a time point $t_i$ in comparison to the reference grid or reference motion field shown on the left side of FIG. 3. As mentioned above, as the basis function for describing an activity in the neighborhood of the grid points $r_i$, a blob may be used. On the left side of FIG. 3, an undisturbed blob at a grid point $r_i$ at the reference grid is shown. The right side of FIG. 3 shows the displacement and distortion of the same blob after taking the motion and the distortion of the object of interest into account. As may be taken from the right side of FIG. 3, in comparison to the left side of FIG. 3, from a circular form on the left side, the blob has been distorted to an egg-like shape on the right side of FIG. 3. Furthermore, the position of the blob has moved to the right side and the breadth of the blob has increased.

Figure 4:
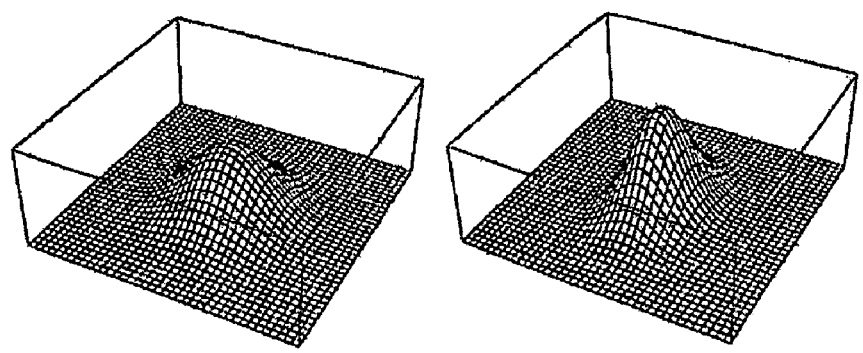
FIG. 4 shows another simplified schematic representation for further explaining the present invention.

The left side of FIG. 4 shows a 3D view of a 2D standard blob. The right side of FIG. 4 shows the view of the blob if the local deformation was a compression by a factor of 1.5 in one direction.

Thus, according to an aspect of the present invention, the reference image $A_{0+n}(x,y)$ is forward-projected by using the motion field such that it is projected, motion and deformation corrected, onto the respectively measured projection of the emission data. Thus, by also taking this motion and deformation information into account by back-projecting the correction factors for the intermediate image, each basis function, i.e. voxel or blob of the intermediate image is only updated with the immediately and directly corresponding information from the respective projection of the emission data by which a blurring or smearing effect in the final image can be avoided and a sharp PET image can be provided.

According to an aspect of the present invention, all data are used in a single reconstruction process in order to maximize the common likelihood function of the image. Furthermore, as apparent to the skilled person, the above described technique may be applied to all known iterative reconstruction techniques known in PET, SPECT or CT imaging, such as, for example, RAMLA, ME-ML, OS-ME-ML, or ART.

The invention claimed is:

1. A method of reconstructing an image from measured line-integrals of an object, the method comprising the steps of: binning of the measured line-integrals into a plurality of temporal bins; determining a plurality of motion fields for the plurality of temporal bins; selecting first data from a selected bin of the plurality of temporal bins; forward-projecting an intermediate image for forming second data by using a motion field of the plurality of motion fields that belongs to the selected temporal bin; determining a difference between the first data and the second data; up-dating the intermediate image on the basis of the difference.

2. The method according to claim 1, wherein the intermediate image is up-dated on the basis of a back-projection performed by using the motion field that belongs to the selected temporal bin.

3. The method according to claim 1, wherein the plurality of motion fields contains information with respect to a location shift and a local deformation of basis functions of the intermediate image with regard to the measured line-integrals.

4. The method according to claim 1, wherein the steps of claim 1 are iteratively performed until an end criterion has been fulfilled.

5. The method according to claim 1, wherein the plurality of motion fields describes at least one of a motion and deformation of the object with respect to a reference grid of the intermediate image.

6. The method according to claim 1, wherein the plurality of motion fields is determined from a set of images where each image is reconstructed using data from one temporal bin of the plurality of temporal bins only.

7. An image processing device for reconstructing an image from measured line-integrals, comprising: a storage for storing the positron emission data; and an image processor for reconstructing the image from the measured line-integrals; wherein the image processor is adapted to performs the following operation: binning of the measured line-integrals into a plurality of temporal bins; determining a plurality of motion fields for the plurality of temporal bins; selecting first data from a selected bin of the plurality of temporal bins; forward-projecting an intermediate image for forming second data by using a motion field of the plurality of motion fields that belongs to the selected temporal bin; determining a difference between the first data and the second data; and up-dating the intermediate image on the basis of the difference.

8. A positron emission tomography system, wherein the positron emission tomography system includes a storage for storing measured line-integrals and an image processor, wherein the image processor performs the following operation: binning of the measured line-integrals into a plurality of temporal bins; determining a plurality of motion fields for the plurality of temporal bins; selecting first data from a selected bin of the plurality of temporal bins; forward-projecting an intermediate image for forming second data by using a motion field of the plurality of motion fields that belongs to the selected temporal bin; determining a difference between the first data and the second data; up-dating the intermediate image on the basis of the difference.

9. A computer program stored on a computer readable medium comprising computer program means to cause a processor to execute the following steps when the computer program means are executed on the processor: binning of the measured line-integrals into a plurality of temporal bins; determining a plurality of motion fields for the plurality of temporal bins; selecting first data from a selected bin of the plurality of temporal bins; forward-projecting an intermediate image for forming second data by using a motion field of the plurality of motion fields that belongs to the selected temporal bin; determining a difference between the first data and the second data; up-dating the intermediate image on the basis of the difference.

* * * * *